United States Patent [19]
Brotz

[11] Patent Number: 6,161,382
[45] Date of Patent: Dec. 19, 2000

[54] THERMOELECTRIC ACTUATOR

[76] Inventor: Gregory R. Brotz, P.O. Box 1322, Sheboygan, Wis. 53081

[21] Appl. No.: 09/351,799

[22] Filed: Jul. 13, 1999

Related U.S. Application Data

[63] Continuation-in-part of application No. 08/775,520, Dec. 31, 1996, Pat. No. 5,921,083, which is a continuation-in-part of application No. 08/532,352, Sep. 22, 1995, Pat. No. 5,588,295, which is a continuation-in-part of application No. 08/349,793, Dec. 6, 1994, abandoned, which is a continuation-in-part of application No. 07/921,631, Jul. 30, 1992, abandoned.

[51] Int. Cl.[7] ............................. H02N 10/00; F01B 29/10
[52] U.S. Cl. ............................................. 60/528; 310/307
[58] Field of Search ..................................... 310/306, 307; 318/117; 60/528, 529

[56] References Cited

U.S. PATENT DOCUMENTS

| | | | |
|---|---|---|---|
| 3,203,166 | 8/1965 | Flanagan | 60/528 |
| 3,460,015 | 8/1969 | Hines | 318/117 |
| 3,690,065 | 9/1972 | Bucalo | 60/529 |
| 4,526,842 | 7/1985 | Eide | 428/617 |
| 4,556,050 | 12/1985 | Hodgson et al. | 60/527 |
| 4,636,149 | 1/1987 | Brown | 417/322 |
| 5,588,295 | 12/1996 | Brotz | 60/528 |
| 5,921,083 | 7/1999 | Brotz | 60/528 |

*Primary Examiner*—Clayton LaBalle
*Attorney, Agent, or Firm*—William Nitkin

[57] ABSTRACT

A three-layered metallic semiconductor strip in the form of a thermocouple with self-contained heating and cooling means when an electrical current is applied thereto to cause the controlled expansion and contraction of selected layers to move the strip to accomplish work.

2 Claims, 5 Drawing Sheets

THERMOELECTRIC ACTUATOR

This application is a continuation-in-part of my previous application entitled Triclad Thermoelectric Actuator, Ser. No. 08/775,520 filed Dec. 31, 1996, now U.S. Pat. No. 5,921,083, which was a continuation-in-part of my previous application entitled Tri-strip Memory Metal Actuator, Ser. No. 08/532,352 filed Sep. 22, 1995, now U.S. Pat. No. 5,588,295, which was a continuation-in-part of my previous application entitled Tri-metallic Semiconductor Strip, Ser. No. 08/349,793 filed Dec. 6, 1994, now abandoned, which was a continuation-in-part of my previous application entitled Bimetallic Strip, Ser. No. 07/921,631 filed Jul. 30, 1992, now abandoned.

BACKGROUND OF THE INVENTION

The device of this invention resides in the area of actuators and more particularly relates to a three-layered semiconductor strip that incorporates both heating and cooling means within its structure for the control and exact positioning of its shape to act as an actuator to accomplish work.

DESCRIPTION OF THE PRIOR ART

Bi-metallic strips are well known in the prior art and are useful for a variety of purposes. They are made of two pieces of metal that are fused together, each piece having a different temperature coefficient of expansion such that when heated, the bimetallic strip will bend, such movement thereby controlling a subsequent operation.

Thermoelectric coolers using the Peltier effect are also well known in the prior art and are used in a variety of devices.

SUMMARY OF THE INVENTION

It is an object of this invention to provide a three-layered strip with means for the precise control of its linear movement which strip can be utilized in many functions such as an actuator. One outer layer is made of a first material or has a coating thereon, and the other outer layer is made of a material which in some embodiments can be the same as said first material or has a coating thereon. The middle layer is made of a second material different from said first material. In such three-layered strip actuator, each layer can have a different, or can have the same, coefficient of expansion. Such strip actuators form a thermocouple and thus provide their own means for heating and cooling when electrical current is applied to the actuator. In one embodiment such actuator strip can be comprised of a three-layer, semiconductive clad strip member made of at least two dissimilar materials, such as having outer layers of material A sandwiching an inner core of material B. The types of such materials are discussed below. The layers are configured in an $A^1BA^2$ arrangement, forming such thermoelectric couple such that when an electrical current is passed therethrough, cooling using the Peltier effect will occur on the first layer of the strip, causing for example the $A^1$ material to contract while at the same time heating will occur on the other opposite second layer of the strip causing the $A^2$ material to expand to produce a difference in length between the first layer $A^1$ and the second layer $A^2$ which difference in length causes such strip actuator to bend. The material of each layer in some embodiments or its coating can be semiconductors of the type that are metallic, crystalline, amorphous, or polymer-based. The materials used in the different layers can also be a combination of metallic or inorganic-based materials or semiconductors and polymer-based semiconductor material. There can be more than one thermoelectric couple within an actuator.

It is well known that changes in the temperature of a solid body can produce changes in the body's volume, shape and dimensions. These phenomena can be explained as discussed below.

The atoms of a solid vibrate about their equilibrium positions, and the amplitudes of these vibrations change when the temperature of the solid changes. Since vibrations are anharmonic, the frequencies of the vibrations change slightly with the change of temperature, and the mean positions of the atoms will therefore be displaced with respect to neighboring atoms.

The thermal coefficient of linear expansion (or contraction) of a dimension L of a body is:

$$CL = \frac{dL}{L \times dT}$$

where dL is the change in the dimension L produced by a change in temperature dT. The coefficient CL is positive for most ordinary materials; and negative for some unusual materials.

The thermal coefficient of volume expansion is:

$$Cv = \frac{dV}{V \times dT}$$

where V is the volume at temperature T and constant pressure, and dT is the change in temperature. The volume of a solid depends upon the external pressure, but the variations of volume with pressure are extremely small. In a homogenous isotropic solid, CL is the same in all directions, and Cv=3CL. In a non-isotropic solid, such as a crystal, CL may depend upon the direction in which the coefficient is measured.

The "Gruneisen law," derived in 1908 from empirical data, states that the ratio of the coefficient of thermal linear expansion of an isotropic solid to its specific heat per unit volume is approximately independent of temperature.

The device of this invention in one embodiment includes means for heating the hot junction side of its tri-clad semiconductor strip which is used as the heating element and a means for cooling the cold junction side of its tri-clad semiconductor strip, with the heating and cooling occurring simultaneously to varying degrees. The means for cooling the tri-clad strip is based on the Peltier effect where an absorption of heat and, hence cooling, takes place as current is passed from a cold junction to a hot junction through a semiconductor. Electrons passing from the cold junction give up an amount of energy equal to the transport energy and the energy difference between the dissimilar semiconductive materials and cause a cooling effect at the cold junction by having such heat radiate from the hot junction to create thermoelectric cooling. Using three layers to make a tri-clad semiconductor strip where there is a temperature difference at the junctions due to the Peltier effect will significantly affect the movement in certain ranges of the strip sandwich.

The device of this invention acts together as a thermal electric device that needs no means for carrying away heat or touching any heat sink. In one of its simplest embodiments, it exists, for example, as layers of a first strip of copper, a second strip of bismuth, and a lower strip of copper fused together in a sandwich form. By inducing current in one direction, the tri-clad strip would bend and by having the current go in an opposite direction by switching the poles, the current would cause such strip to bend in the opposite direction to a degree with such movement being useful to do work such as activate switches. Further, multiple tri-clad strips can be utilized in serpentine fashion for linear movement as will be described further below.

DESCRIPTION OF THE PREFERRED EMBODIMENT(S)

Figure 1:
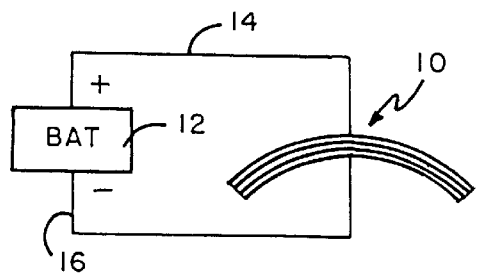
FIG. 1 illustrates a side view of one embodiment of a tri-metallic strip of this invention composed of a copper outer layer, a bismuth inner layer and a copper bottom layer with current being passed in one direction therethrough.
Figure 2:
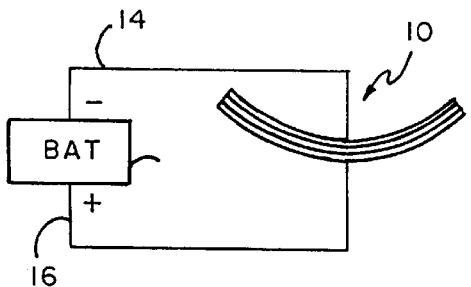
FIG. 2 illustrates a side view of the tri-metallic strip of FIG. 1 with the polarity of the current reversed, showing the strip bent in the opposite direction.
Figure 3:
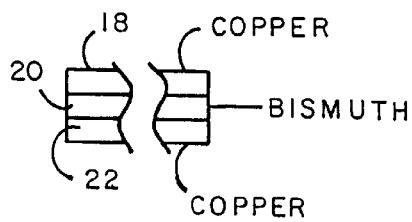
FIG. 3 illustrates a side view of the construction of one embodiment of the tri-metallic strip of this invention.
Figure 4:
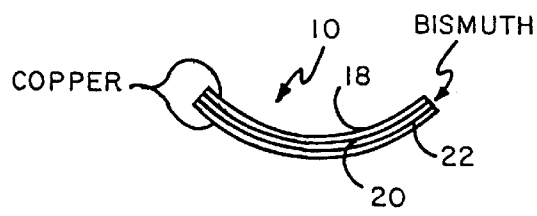
FIG. 4 illustrates a side view of a tri-metallic semiconductor strip showing its NPN structure formed into a complete strip.

FIGS. 3 and 4 illustrate one embodiment of a tri-metallic strip 10 composed of a copper upper strip 18 and copper lower strip 22 sandwiching a bismuth core strip 20. The tri-metallic strip 10 in FIG. 1 is shown having electrical wires 14 and 16 directing current from a battery 12 thereto where the positive terminal is connected to copper upper strip 18 and the negative terminal is connected to copper lower strip 22. In FIG. 2 the polarity of the battery terminals is reversed such that the negative polarity runs through wire 14 to copper upper strip 18 and the positive polarity runs through wire 16 to copper lower strip 22 such that the curve and bend of the tri-metallic strip is opposite to that seen in FIG. 1. Although copper and bismuth are illustrated in FIGS. 1–4, other equivalent materials and semiconductive materials can be utilized to achieve a desired movement of the tri-clad strip of this invention. Doped strips of conductive organic polymer, such as polyaniline, polyacetylene, polypyrrole, and polythiophene can also be used.

Figure 8:
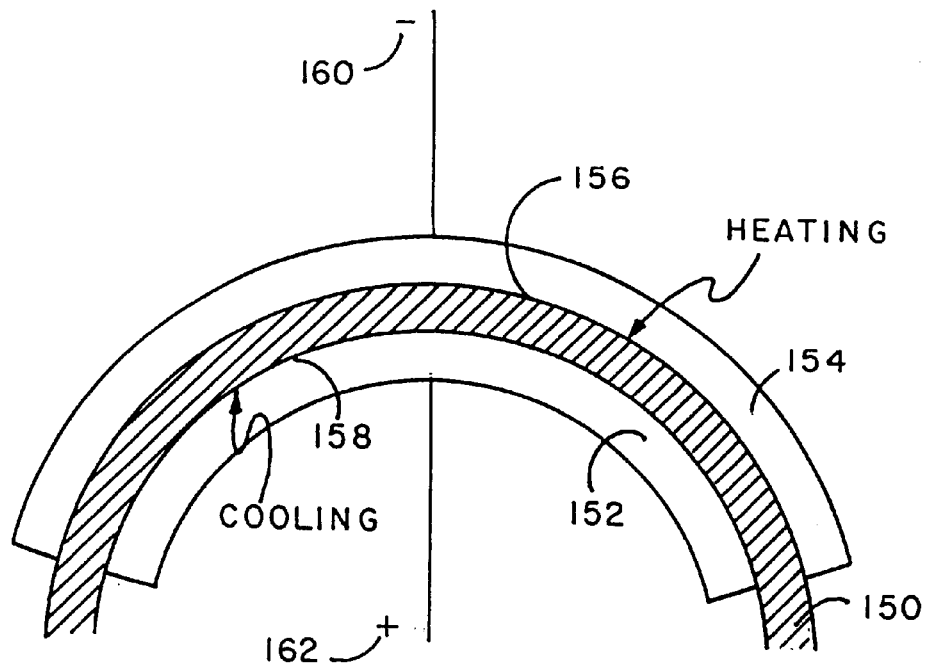
FIG. 8 illustrates a side view of one embodiment of a tri-clad strip having a core clad with two strips of material on each side, being heated on one side and cooled on the other side.
Figure 9:
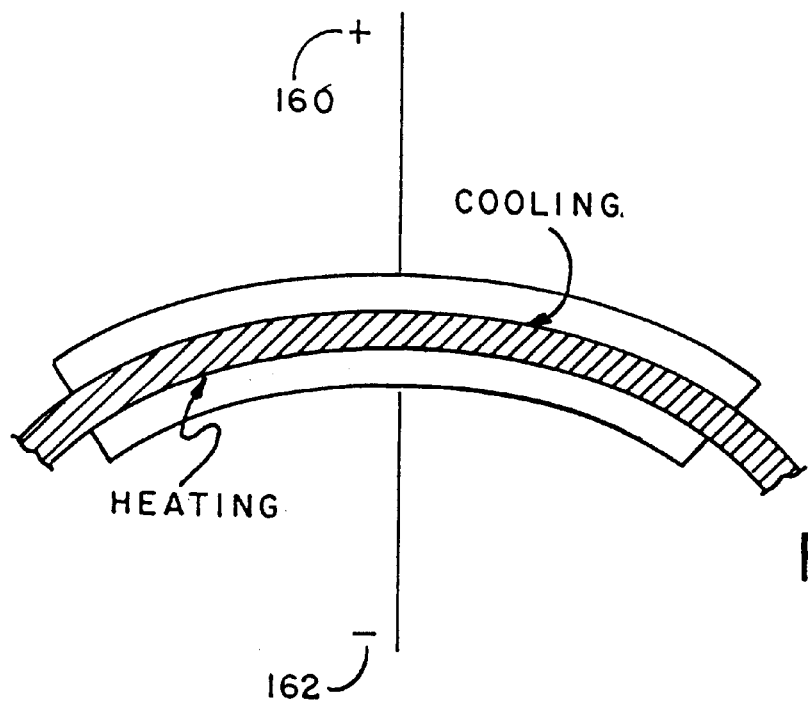
FIG. 9 illustrates a side view of the tri-clad strip of FIG. 8 after a temperature change, causing straightening of the strip to increase its length.

While in some embodiments of this invention the layers can have different coefficients of thermal expansion, it should be noted that the coefficient of thermal expansion of the outer layers can be the same in other embodiments. An actuator, such as seen in FIGS. 8 and 9 can be composed of a three-layer clad member having at least two dissimilar materials, such as central core 150 made of a material B and first and second sides 152 and 154, respectively, made of material A, fashioned to form a thermoelectric couple so that when electrical current from points 160 and 162 is passed therethrough, cooling will occur at junction 158 causing the material of first side 152 to contract while at the same time heating will occur on the opposite side of central core 150 causing the material of second side 154 to expand to produce a difference in length between first side 152 and second side 154 and causing the structure to bend. In FIG. 9 the polarity of the electric current running from point 160 to point 162 is reversed, causing a cooling at junction 156 and a heating at junction 158 and causing the tri-clad strip to straighten.

Some P and N type semiconductors are as follows:

|  | Type | Figure of Merit |
| --- | --- | --- |
| PbTe | N | 2.8 |
| PbTe | P | 2.2 |
| Bi Te | N | 1.9 |
| Bi Te | P | 1.8 |

Semiconductors have large thermoelectric power compared to plain metals and thus are good substitutes for metals.

Thin film semiconductors can be applied by doping from a gas phase directly onto the metal strips. In some instances a plasma impregnation can be utilized. The doping of coatings from the gas phase is a well known procedure which can be applied to be utilized with materials exhibiting semiconductive properties. The creation of thin layers or films of semiconductive materials is desirable to avoid problems of brittleness and/or cracking as some thicker semiconductors can exhibit crystalline properties. Other methods of applying thin, flexible coatings can be accomplished using pulsed laser annealing. Other annealing techniques, such as heating gaseous semiconductive materials in close contact with a strip of opposite charge so as to attract the gaseous material thereto, can also be utilized. Semiconductive organic films have been prepared by plasma polymerization which films can also be utilized in the structure of this invention.

The Peltier effect is dependent on the Kelvin relation; and thus the thermoelectric power (S) must be large to maximize the cooling effect, and the resistivity (p) must be small. This effect will reduce Joule or resistance heating. The thermal conductivity (k) must be small so that a large temperature difference can be maintained. When these material requirements are combined to produce a thermoelectric device, its efficiency is called the "figure of merit" (Z). It has a relationship of:

$$Z = \frac{S}{KP}$$

Figure 5:
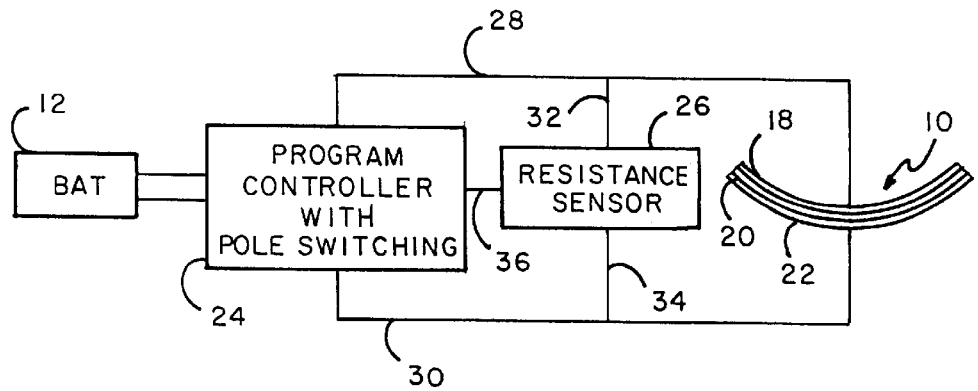
FIG. 5 illustrates a side view of a structure where the current is controlled by polarity switching utilizing a resistance sensor that can determine the positioning of a tri-metallic strip.

FIG. 5 shows a program controller computer 24 with battery pole switching connected through electrical wires 28 and 30 to tri-metallic strip 10, directing current from battery 12 with the ability to reverse the polarity on each side of a tri-metallic strip. A resistance sensor 26 is interconnected to the program controller by wire 36 and interconnected to wires 28 and 30, respectively, by wires 32 and 34. Resistance sensor 26 can sense the amount of electrical resistance through the tri-metallic strip, and the program controller can then calculate such resistance to use it for the positioning of the tri-metallic strip when acting as an actuator. Electrical resistance through the outer metallic strips of the tri-metallic strip is directly proportional to the temperature. Thus, if a resistance reading were taken, it would indicate the temperature of the combined strips of the tri-metallic strip; and thus the exact curved position of the tri-metallic strip could then be determined. The program controller computer takes into account the polarity in combination with the resistance. Assuming that the tri-metallic strip actuator is well burned in, at any temperature such actuator should be at the same position repeatedly so that a mere determination of its temperature will give an indication of its physical position.

Figure 6:
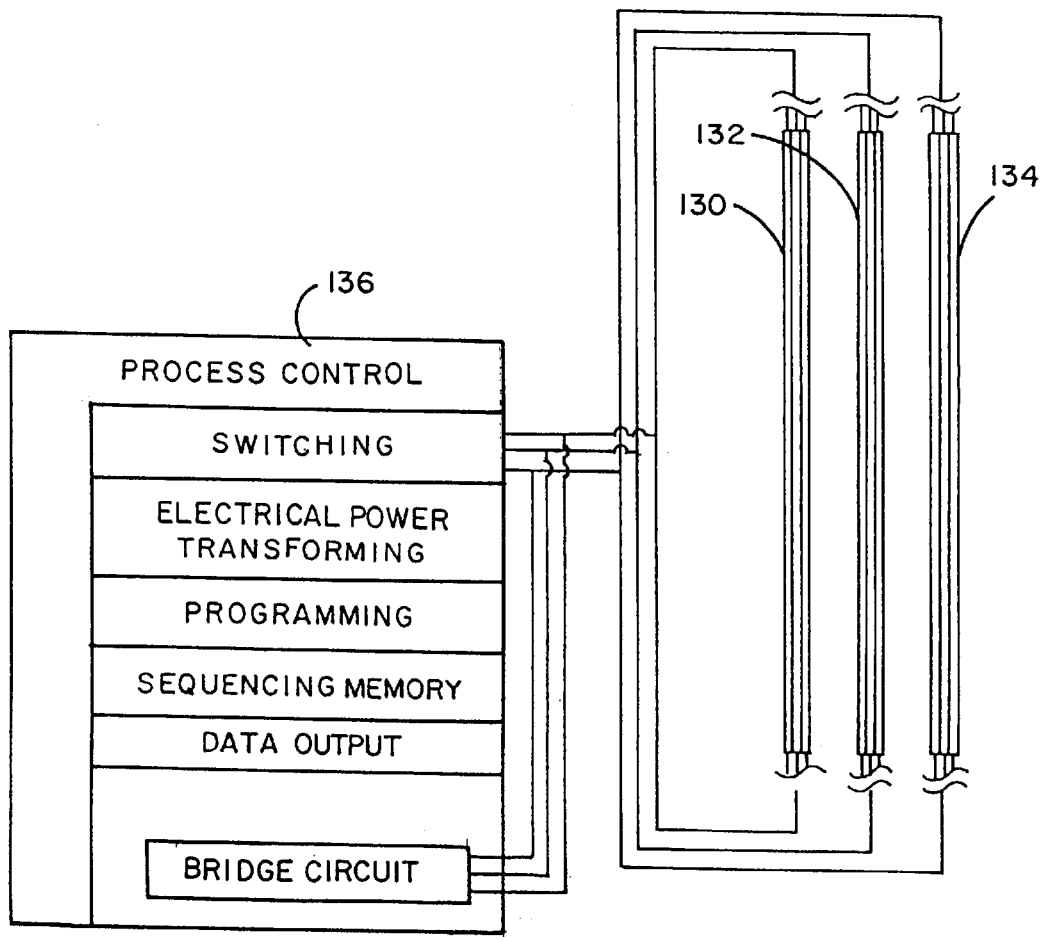
FIG. 6 illustrates a side view of a plurality of tri-metallic strips through which a sequencing memory will direct a process controller to direct power to each to cause each to bend in a desired fashion.

FIG. 6 illustrates three tri-metallic strip actuators 130, 132 and 134 which are interconnected to process controller 136 such that they can act in concert with one another to perform one or more tasks. Process controller 136 can be a computer that will calculate information about the position of each actuator by sensing the resistance through the outer strips of each actuator wherein such electrical resistance, as described above, is proportional to its temperature. Process controller 136 can then determine the position of each actuator by the determination of such resistance.

Figure 7:
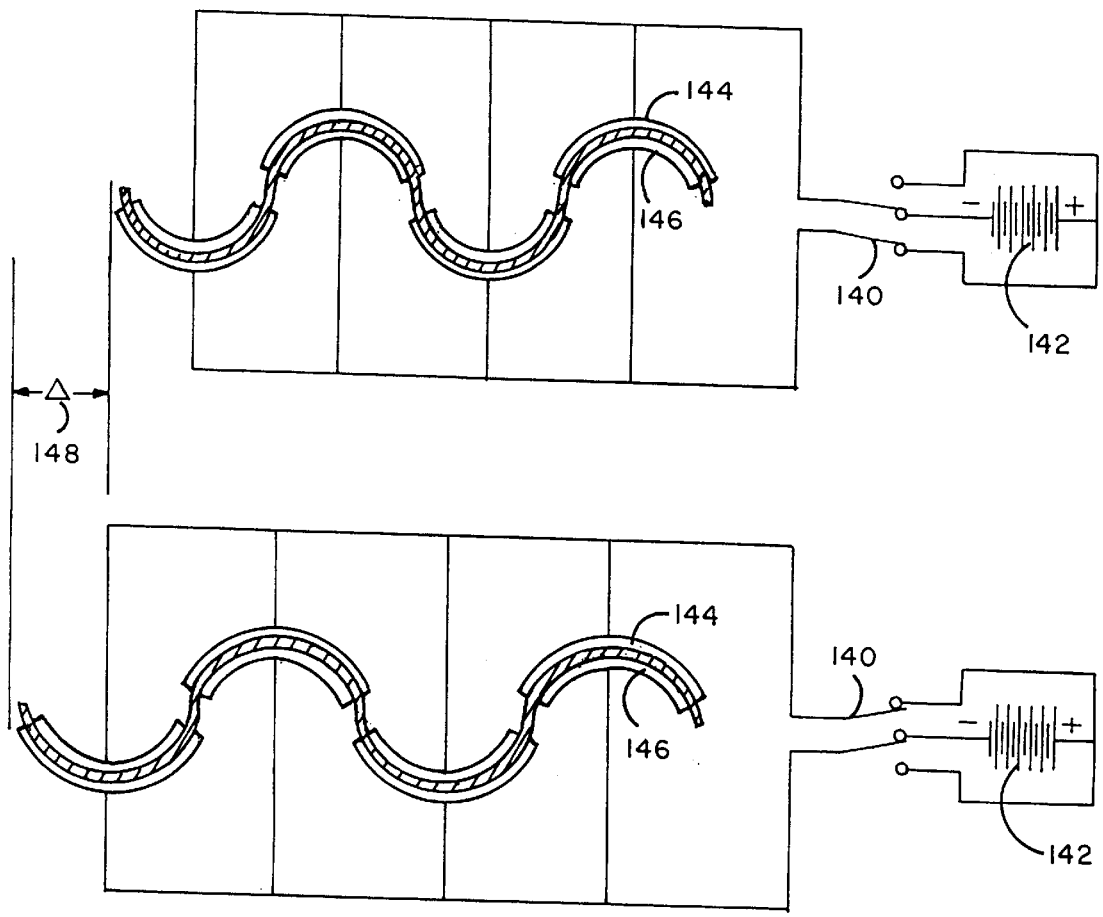
FIG. 7 in its upper portion illustrates a side view of a first embodiment of a serpentine tri-metallic strip in a first position, and in its lower portion, illustrates the same tri-metallic strip receiving current from the power source having a reversed polarity, causing the strip to extend a distance, delta, to a second position.

A practical embodiment of the tri-clad strip of this invention is seen in FIG. 7 wherein in the upper portion of this Figure a double-pole throw switch 140 directs power from power supply 142 at one polarity to the upper and lower strips of the serpentine tri-metallic strip using multiple N and P junctions within the structure as a whole and when the power polarity is reversed, as seen in the bottom portion of FIG. 7, the tri-metallic strip expands, thereby changing its length a distance, delta 148.

A typical structure of a portion of such a strip is seen in FIG. 8 where strip 150 on one material is sandwiched between two strips 152 and 154 of a different material. Heating junction 156 is located on the upper portion of strip 150 and the cooling junction 158 is located on its lower portion such that when electrical polarity 160 and 162 is changed therethrough, the strip straightens, as seen in FIG. 9, which movement can be used to produce work.

Figures 10, 11:
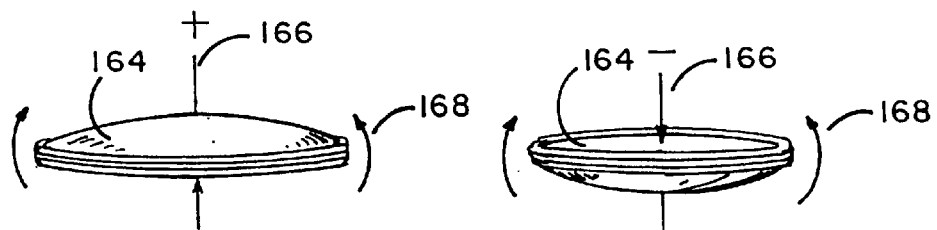
FIG. 10 illustrates a perspective view of a further embodiment of this invention being a tri-metallic disk bending in one direction, indicated by arrows, based on the polarity of currents running thereto.
FIG. 11 illustrates a perspective view of the tri-metallic disk of FIG. 10, being in the opposite direction as seen in FIG. 10 after the polarity has been reversed.

The same type of movement can be obtained from the embodiment of this invention illustrated in FIGS. 10 and 11 wherein a tri-metallic disk is illustrated. When disk 164 has a current polarity 166 running in one direction, as seen in FIG. 10, its direction of movement is upwards as indicated by arrow 168. When the current polarity is changed, disk 164 bends downward as indicated by arrow 168 in FIG. 11.

Figure 12:
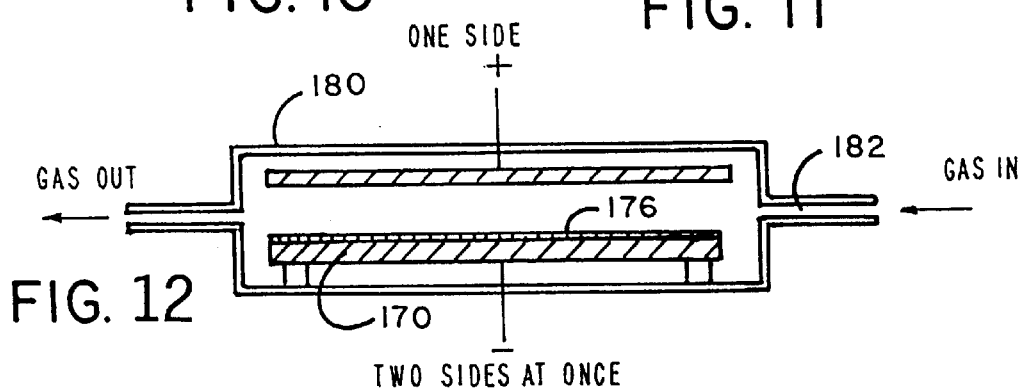
FIG. 12 illustrates a side view of a chamber with semiconductive material being coated onto one side of a strip.
Figure 13:
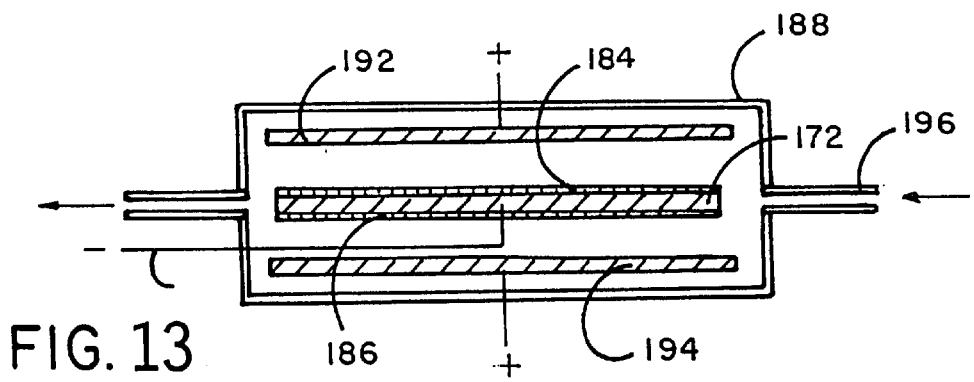
FIG. 13 illustrates a side view of a chamber with semiconductive material being coated onto both sides of a strip.
Figure 14:
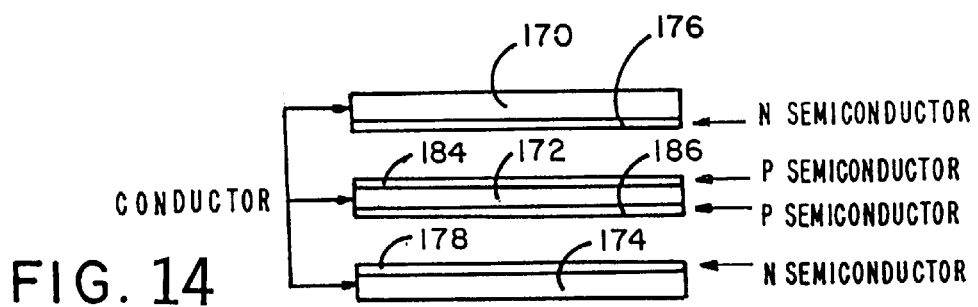
FIG. 14 illustrates a side view of the components of a tri-clad strip separated from one another.
Figure 15:
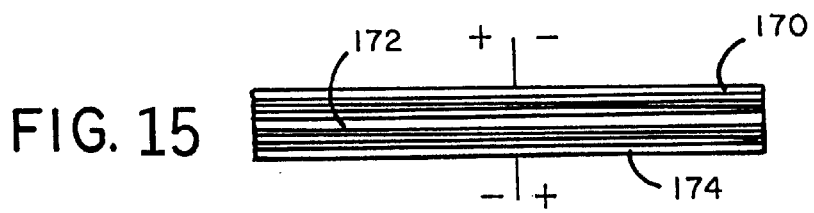
FIG. 15 illustrates a side view of the tri-clad strip of FIG. 14 with its components compressed together.

FIG. 15 illustrates an alternate embodiment of the tri-clad thermoelectric actuator utilizing three conductor strips, the first conductor strip being 170 having an N-type semiconductor doped on one surface by plasma impregnation, the semiconductor being of the thin, flexible type. FIG. 12 illustrates the application of a thin layer of N-type semiconductor 176 being applied to metal strip 170 where it is applied coming in to chamber 180 through gas line 182 and attracted by an opposite electrical charge and by plasma impregnation to be doped onto the surface of metal strip 170 by electrical attraction thereto. A similar procedure is followed with strip 174, as seen in FIG. 14, having an N-type semiconductor layer 178 applied thereto. Central metal strip 172, seen in FIG. 14, can have both sides thereof doped at the same time by a P-type semiconductor coating layers 184 and 186 on each side thereof in chamber 188 where central strip 172 has a negative charge 190 applied thereto, being contained between two positively charged plates 192 and 194 such that when the gas enters chamber 188, as seen in FIG. 13, through pipe 196, P-type semiconductor coatings are doped on each side of strip 172 such that when strip 172 is later positioned between strips 170 and 174, a sandwich, as seen in FIG. 15, can be created when the strips are compressed together which will flex in a selected direction dependent upon the polarities of current applied to each side as described above. The use of thin, flexible semiconductor layers aids in providing flexibility to the final product.

Although the present invention has been described with reference to particular embodiments, it will be apparent to those skilled in the art that variations and modifications can be substituted therefor without departing from the principles and spirit of the invention.

I claim:

1. An actuator, comprising:

a first strip made of a material, a second strip made of a different material than said first strip, and a third strip made of the same material as said first strip, said first, second and third strips being joined together, forming a first junction between said first and second strips and a second junction between said second and third strips;

an electrical current power source producing current at a selected of a first polarity or a second polarity;

means to heat said first strip at said first junction by applying electrical current at said first polarity through said first strip to said third strip from said power source; and means to cool said third strip by thermoelectric cooling of said third strip at said second junction, thereby expanding said first strip and contracting said third strip and moving said actuator in a first direction, said actuator when receiving electric current having a reversed second polarity from said first polarity of the electrical current, causing said first junction to cool and said second junction to heat, thereby expanding said third strip and contracting said first strip, and moving said actuator in a second direction.

2. The actuator of claim 1 wherein said materials of said first strip, said second strip and said third strip are semiconductive materials.

* * * * *